Figure 1:
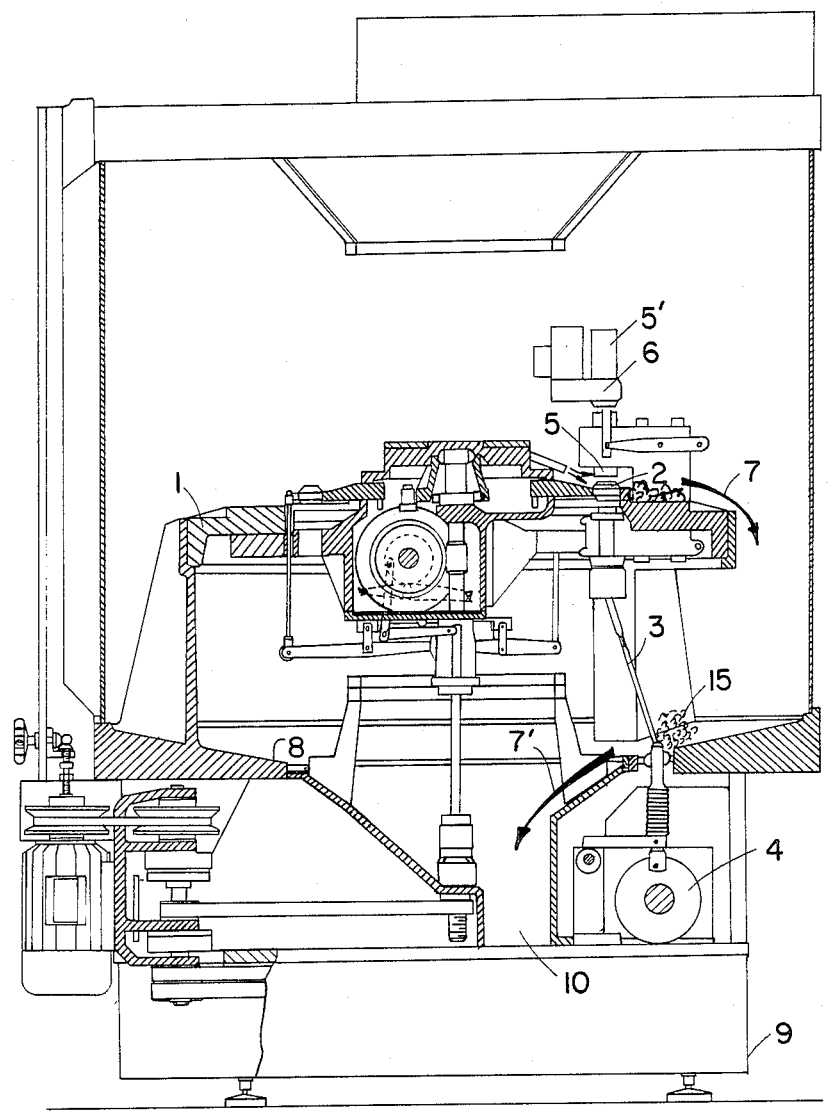

United States Patent [19]

Giovanola

[11] Patent Number: 4,523,360
[45] Date of Patent: Jun. 18, 1985

[54] PIECE-HOLDER TABLE REVOLVING INTERMITTENTLY IN MACHINE TOOLS

[75] Inventor: Massimo Giovanola, Lugano, Switzerland

[73] Assignee: Albe S.A., Agno, Switzerland

[21] Appl. No.: 554,342

[22] Filed: Nov. 22, 1983

[30] Foreign Application Priority Data

Jun. 7, 1983 [CH] Switzerland ............ 3109/83

[51] Int. Cl.$^3$ .................. B23Q 11/00; B23Q 39/04
[52] U.S. Cl. ............... 29/38 C; 29/DIG. 63; 29/DIG. 78; 29/DIG. 91; 29/DIG. 101; 408/45; 408/68; 409/137; 409/173; 409/198
[58] Field of Search .......... 29/38 C, 38 A, 33 J, 29/DIG. 50, DIG. 54, DIG. 61, DIG. 63, DIG. 78, DIG. 81, DIG. 87, DIG. 88, DIG. 91, DIG. 94, DIG. 101, DIG. 102; 408/45, 73, 67, 68; 409/137, 136, 158, 159, 161, 173, 197, 198; 51/240 T

[56] References Cited

U.S. PATENT DOCUMENTS 2,395,237  2/1946  Swenson ............... 29/DIG. 81
4,473,930 10/1984  Bezner et al. ............ 29/38 C

FOREIGN PATENT DOCUMENTS 2508571  9/1976  Fed. Rep. of Germany ...... 29/38 C

*Primary Examiner*—Z. R. Bilinsky
*Attorney, Agent, or Firm*—Young & Thompson

[57] ABSTRACT

A table (1) revolving intermittently and carrying on its periphery piece-holder grips, has central openings (11), which make possible the discharge of working shavings and wastes at the center of the table itself (arrow 12) and not at the periphery (arrows 7, 7') as now is done. This makes possible direct discharge of the working shavings and wastes in the collection container underneath and avoids clogging and stopping of the machine for cleaning which requires the presence of additional labor and limits production. Nozzles (13, 13') direct fluid radially inwardly to assist in this central discharge of shavings and wastes.

1 Claim, 5 Drawing Figures

PIECE-HOLDER TABLE REVOLVING INTERMITTENTLY IN MACHINE TOOLS

Machine tools are known, especially for working small pieces in series with great precision such as the points of ball point pens, electric contacts and the like, in which, since numerous successive working phases have to be performed, the pieces are placed on the periphery of a table revolving intermittently, fastening them between suitable grips. The tools are placed around, over and under the piece-holder table, and are preferably driven by small independent motors and tappets controlled by cams, tools that each perform a work phase during the pause of the table between two interruptions.

If, for example, 40 tools are placed around the table, each of which performs a work phase at each turn of the table, a piece that enters rough at the beginning of the rotation, leaves the table perfectly finished.

The machine with an intermittently revolving table, the object of Swiss Pat. No. 635,262 of this applicant, is indicated as an example.

In said known machines, the working shavings and wastes which are obtained at each station, for example, the shavings resulting from drilling, turning and milling and the wastes resulting from grinding, boring and grinding of the various parts, are normally discharged at the periphery of the revolving table, since the tools are located on the periphery and are successively carried for discharge.

But discharge of the shavings and wastes from the periphery of the revolving table presents notable drawbacks, since the space between the various work stations is very limited. This is the cause of piling up of said shavings and wastes on the table, so that, after a certain time, the machine has to be stopped for cleaning.

Further, said shavings and wastes accumulate at the control tappets at the various stations and at times this causes clogging of the machine, which causes considerable, valuable time to be lost.

All these drawbacks are eliminated by the improvement which is the object of this invention.

The improvement in question is characterized by the fact that said piece-holder table exhibits arrangements and means for discharging the working shavings and wastes toward the central part of the table itself, i.e., centripetally.

For better understanding, the accompanying drawings show:

In FIG. 1 an axial section of a known type of machine to show the travel of the shavings in the centrifugal direction, i.e., toward the outside of the piece-holder table.

Figure 2:
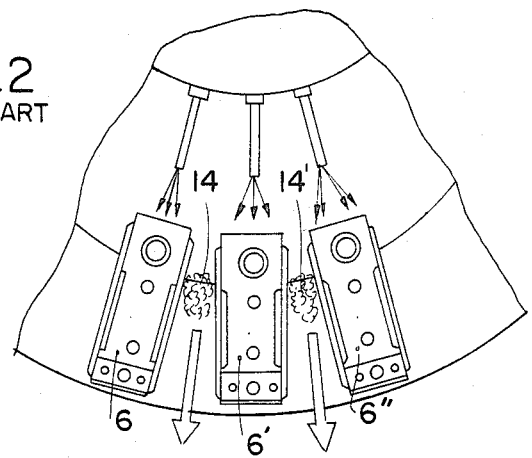

In FIG. 2 a partial plan view of the known type piece-holder table according to FIG. 1 at three work stations.

Figure 3:
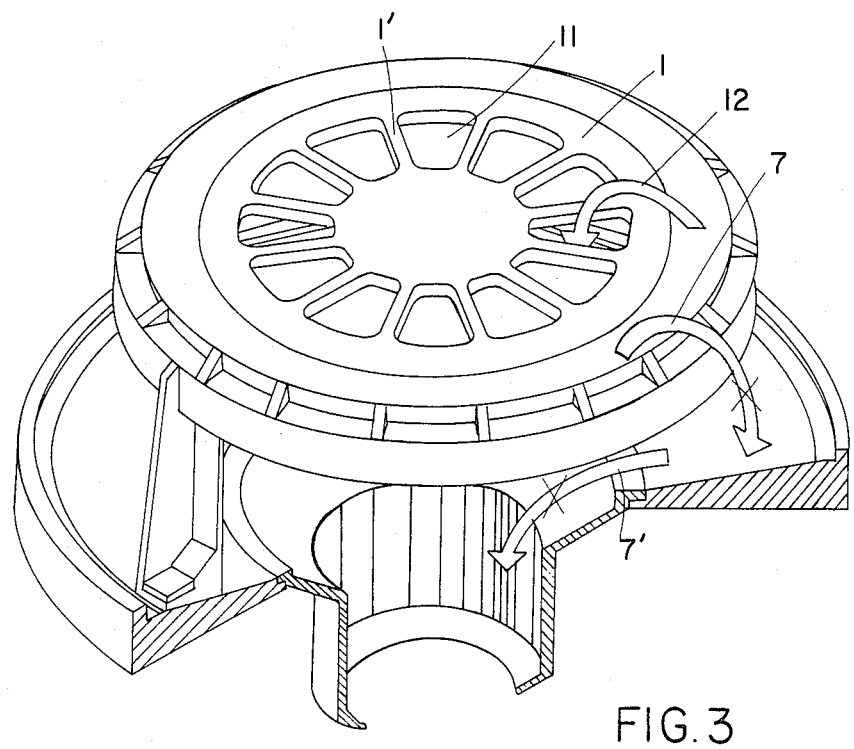

In FIG. 3 a perspective view of the improved piece-holder table according to the invention.

Figure 4:
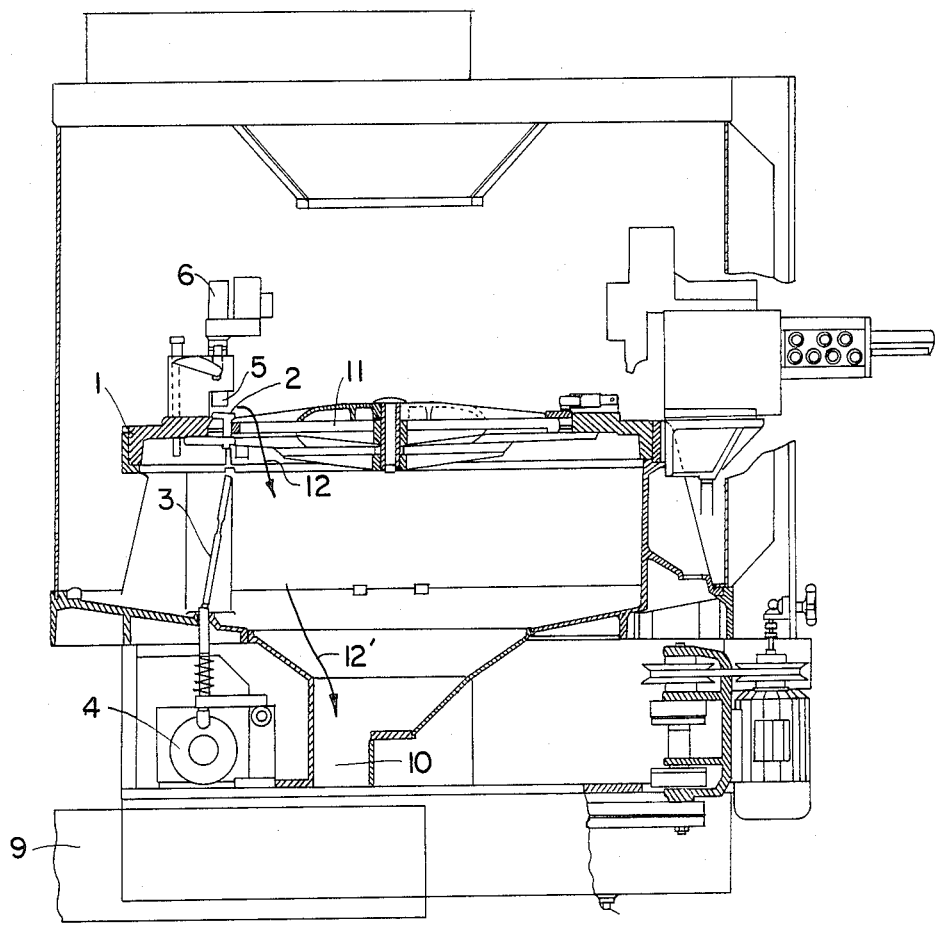

In FIG. 4 an axial section of the machine to which the improved piece-holder table according to the invention is applied.

Figure 5:
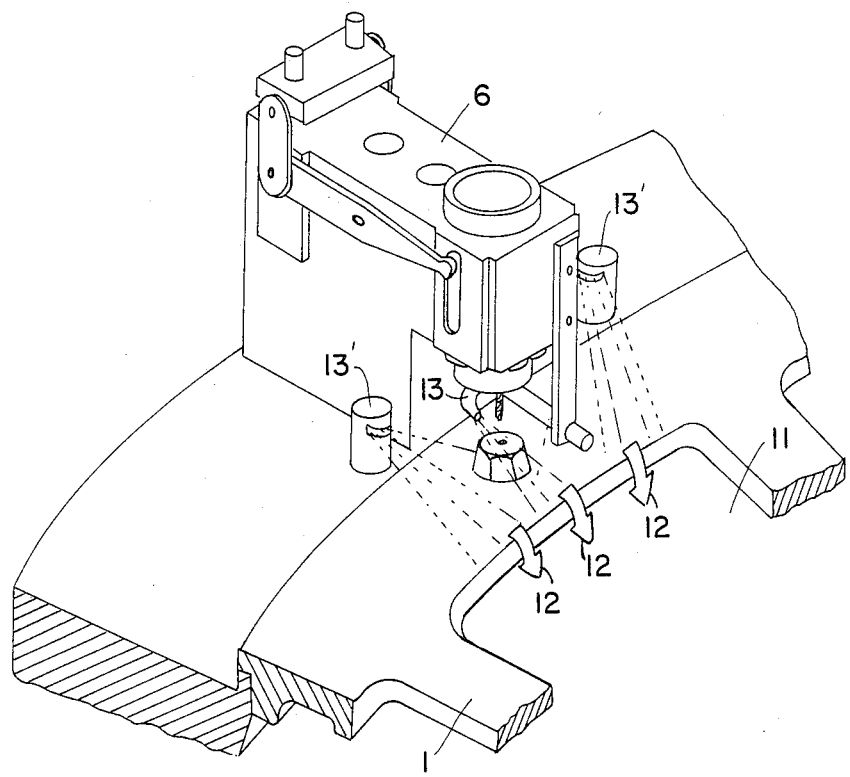

In FIG. 5 a detail of the nozzles for cleaning off the shavings and wastes according to the invention placed at a work station.

With reference to FIG. 1: the known type machine that is shown comprises the intermittently revolving table exhibiting on its periphery a multiplicity of self-centering grips 2 that serve to hold the pieces to be worked, grips opened by tappets 3 controlled by cams 4.

On the periphery of revolving table 1 are placed the various work stations 6 comprising chucks 5 carrying the tools, driven by independent small motors 5'. Said chucks 5 can be placed above, below or laterally with respect to the periphery of work table 1.

Discharge of the working shavings and wastes occurs at the periphery of the piece-holder table 1, i.e., in the direction of arrow 7, 7'. They fall in a tank 8 underneath and are carried to collection container 9 by discharge pipe 10.

This has the drawbacks mentioned above, i.e., piling up of shavings and wastes at points 14, 14' (FIG. 2) between work station 6 and adjacent work station 6' and at points 15 (FIG. 1) near tappets 3 for controlling piece-holder grips 2 and near the tappets (not shown) for controlling the movements of the tools carried by chucks 5.

The clogging produced requires the machine to be stopped for cleaning.

The improvement according to this invention completely eliminates the above-mentioned cloggings so that the machine can operate uninterruptedly even without supervision for an indeterminate period, considerably speeding up production and cutting labor with a notable lowering of the production cost of the worked pieces.

This constitutes the great advantage of the improvement according to the invention.

This is illustrated diagramatically but very strikingly in FIG. 3.

According to the invention, piece-holder table 1 exhibits central slots 11 so that the working shavings and wastes can be discharged toward the center of the piece-holder table (i.e., in the centripetal direction) through slots 11, in the direction of arrow 12 rather than in the present directions 7, 7' which are oriented toward the periphery of piece-holder table 1, i.e., are centrifugal.

To obtain openings 11, revolving table 1 can exhibit spokes 1' that delimit said openings.

FIG. 4 shows the improved machine according to the invention in axial section. Arrows 12, 12' indicate the new travel of the working shavings and wastes.

Nozzles 13, 13' (FIG. 5) are provided to cause the shavings and wastes to be carried to openings 11, and throw out a jet of oil or other liquid or air under pressure in the radial direction toward the center of revolving table 1.

It is to be understood that the shape of openings 11, the shape and arrangement of nozzles 13, 13' can vary in any way, always within the scope of protection of the invention.

I claim:

1. In a machine tool having a multiplicity of work stations arranged about the periphery of an intermittently rotating work-holding table; the improvement in which the table comprises a peripheral circular crown, a central hub, a plurality of spokes interconnecting the crown and the hub and leaving spaces between the spokes, a plurality of work-holders on the crown radially outwardly of said spokes and spaces, and nozzles adjacent the periphery of the table so arranged as to direct jets of fluid radially inwardly across the upper surface of said crown to force material removed from work pieces radially inwardly to be discharged downwardly by gravity through said spaces.

* * * * *